US005749390A

United States Patent [19]

Ermacora et al.

[11] Patent Number: 5,749,390

[45] Date of Patent: May 12, 1998

[54] VALVE HAVING FOUR CONNECTION PORTS AND TWO POSITIONS

[75] Inventors: Rino Ermacora, St-Jean Saverne; Pierre Fischbach, Ottersthal; Roland Helfer, Lampertheim; Martin Walch, Dettwiller; Bernard Wattron, Haegen; Joel Wilhelm, Saint-Louis, all of France

[73] Assignee: Kuhn S.A., Saverne Cedex, France

[21] Appl. No.: 550,208

[22] Filed: Oct. 30, 1995

[30] Foreign Application Priority Data

Oct. 28, 1994 [FR] France .................................. 94 13107

[51] Int. Cl.[6] ................................................ F16K 11/06

[52] U.S. Cl. ................................ 137/106; 91/437; 91/447

[58] Field of Search ................................ 137/106; 91/437, 91/447

[56] References Cited

U.S. PATENT DOCUMENTS

| | | | |
|---|---|---|---|
| 3,568,707 | 3/1971 | Shore . | |
| 4,008,731 | 2/1977 | Katz | 137/106 |
| 5,452,643 | 9/1995 | Smith et al. | 91/437 X |

FOREIGN PATENT DOCUMENTS

| | | |
|---|---|---|
| 0010699 | 5/1980 | European Pat. Off. . |
| 0066274 | 12/1982 | European Pat. Off. . |
| 2537184 | 12/1983 | France . |
| 3601643 | 7/1987 | Germany . |
| 2227295 | 7/1990 | United Kingdom . |

*Primary Examiner*—Stephen M. Hepperle
*Attorney, Agent, or Firm*—Oblon, Spivak, McClelland, Maier & Neustadt, P.C.

[57] ABSTRACT

A valve includes a distributor with four ports and two positions. In a first position, a first non-return valve allows only circulation of a fluid from the first port toward the third port, while the second port and the fourth port are directly in communication with one another. In a second position, the third port and the fourth port are directly in communication with one another, while a second non-return valve allows only circulation of fluid from the third port and the fourth port in communication toward the first port.

5 Claims, 2 Drawing Sheets

VALVE HAVING FOUR CONNECTION PORTS AND TWO POSITIONS

BACKGROUND OF THE INVENTION

1. Field of the Invention

The present invention relates to a valve with four connection ports and two positions which is intended, in one of its positions, to provide fluid power to at least one mechanism to be driven and, in the other position, to connect at least two chambers of the said mechanism(s).

2. Discussion of the Related Art

Conventional related valves have drawbacks especially in that they do not provide a communication between two chambers of the said mechanism(s) with a low or even non-existent pressure.

SUMMARY OF THE INVENTION

Accordingly, an object of the present invention is to provide for a valve which includes four connection ports, of which a first connection port and a second connection port are used to be connected directly or indirectly to a fluid power source. A third connection port and a fourth connection port are to be connected directly or indirectly to the said mechanism(s).

The valve also includes a distributor with four ports, in which a first port, a third port and a fourth port are directly connected or are combined respectively with the first connection port, the third connection port and the fourth connection port, and with two positions that can be made operational by means of a control device. In a first position, a first non-return valve allows only circulation of fluid from the first port toward the third port, while a second port and the fourth port are directly connected to one another. In a second position, the third port and the fourth port are directly connected to one another, while a second non-return valve allows only circulation of the fluid from the third port and of the fourth port that are connected toward the first port.

When the valve in accordance with the invention is in the first position, it is then possible to provide fluid power for the mechanism(s) with a certain pressure, then to maintain this pressure by virtue of the first non-return valve.

When the valve is placed in its second position by means of the control device it is possible, by virtue of the connection of the third port and the fourth port and because of the presence of the second non-return valve, to establish communication of at least two chambers of the said mechanism (s), the pressure in said chambers which are connected being then low, or even zero.

According to an additional characteristic of the invention, a third non-return valve is provided which allows only circulation of the fluid from the second port toward the second connection port. This third non-return valve thus isolates the mechanism(s) from possible pressure increases which can appear at the second connection port when the valve (or more exactly the distributor of the latter) is in the first position.

According to a further characteristic of the invention, at least one of the non-return valves will be of the "with spring" type. Preferably at least the second non-return valve will be of the "with spring" type.

According to a further characteristic of the invention, the two positions of the distributor will, preferably, be capable of being locked by means of a locking device. Preferably this locking device will be a mechanical locking device.

Advantageously, it will be provided that the locking of the two positions is done automatically. In addition, it will also be provided that the unlocking of the positions is accomplished automatically.

According to a further characteristic of the invention, the control device will be able to guide operation of the distributor; in the first position based on the prevailing pressure at the first connection port; and in the second position based on the prevailing pressure at the second connection port.

Accordingly, the present invention provides for a valve which comprises a first connection port and a second connection port which are intended to be connected directly or indirectly to a fluid power source; a third connection port and a fourth connection port which are intended to be connected directly or indirectly to at least one mechanism to be driven; and a distributor comprising a first port, a second port, a third port and a fourth port, wherein the first port, the third port and the fourth port are respectively directly in communication or are combined with the first connection port, the third connection port and the fourth connection port.

The distributor has a first position made operational by a control device in which a first non-return valve allows only circulation of fluid from the first port toward the third port, while the second port and the fourth port are directly in communication with one another, and a second position made operational by the control device in which the third port and the fourth port are directly in communication with one another, while a second non-return valve allows only a circulation of fluid from the third port and the fourth port in communication toward the first port.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
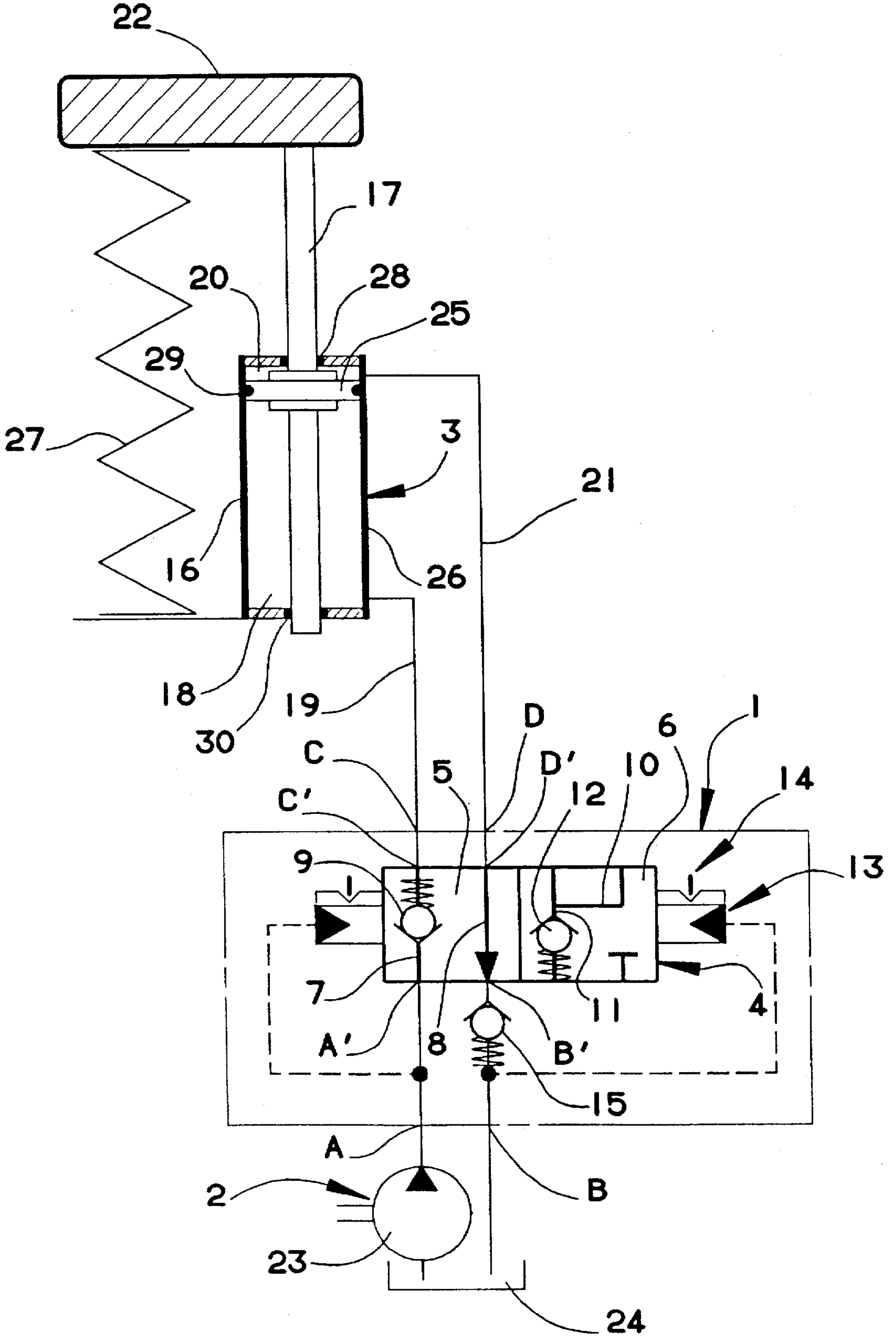
FIG. 1 represents the valve in accordance with the invention when the distributor is in its first position.
Figure 2:
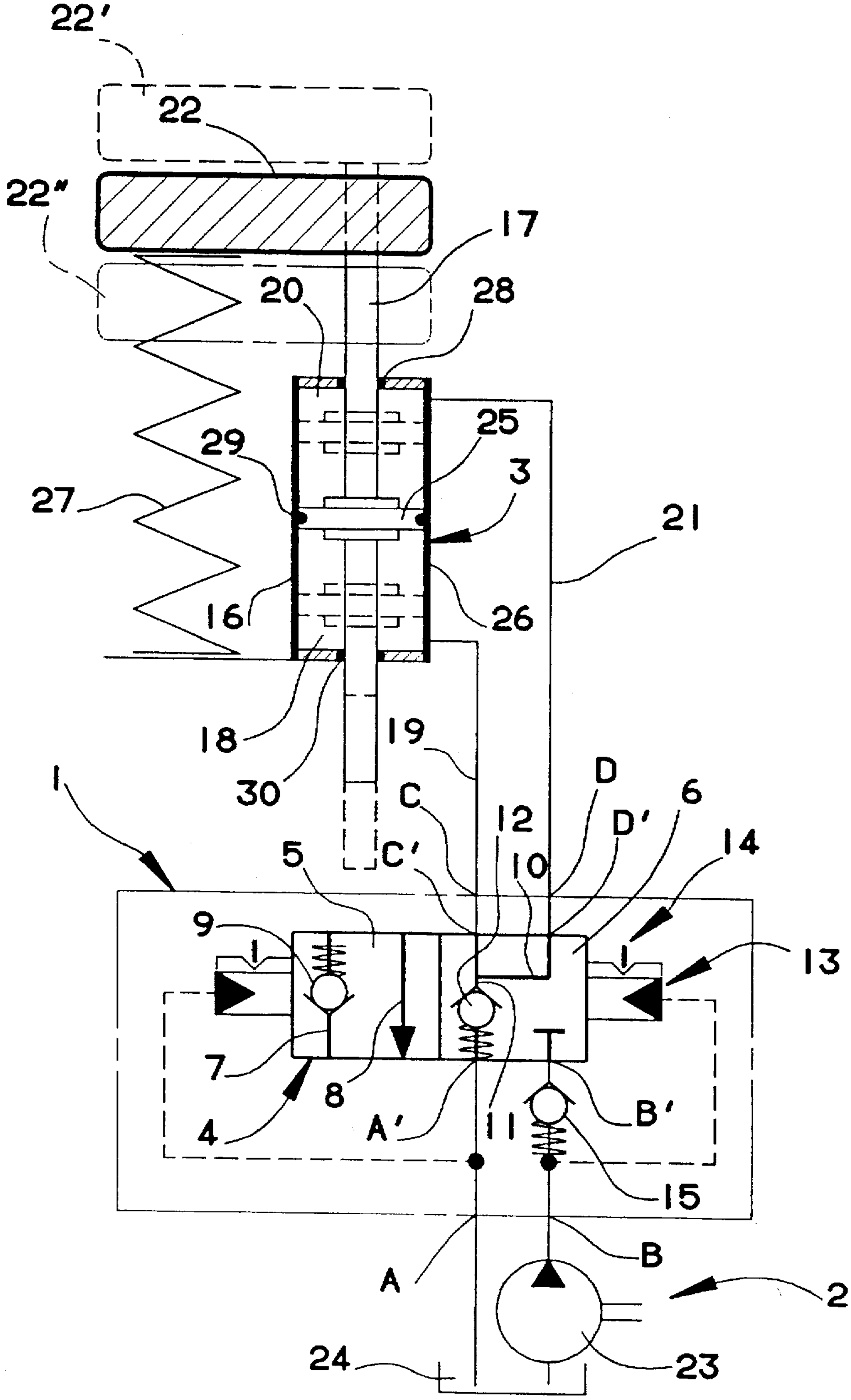
FIG. 2 represents the valve in accordance with the invention when the distributor is in its second position.

Referring now to the drawings, wherein like reference numerals designate identical or corresponding parts throughout the several views, and more particularly to FIGS. 1 and 2 thereof, the valve (1) in accordance with the invention shown schematically in FIGS. 1 and 2 includes four connection ports (A, B, C, D). The first connection port (A) and the second connection port (B) are connected to a fluid power source (2). The third port (C) and the fourth port (D), for their part, are connected to a mechanism (3) to be driven.

The valve (1) also includes a distributor (4) with four ports (A', B', C', D') and two positions (5, 6). The first port (A') is directly connected to the first connection port (A). The third port (C') is directly connected to the third connection port (C). The fourth port (D') is directly connected to the fourth connection port (D).

In the first position (5), the distributor (4) includes two channels (7, 8). The first channel (7), which allows one to establish communication between the first port (A') and the third port (C'), includes a non-return valve (9) which allows only circulation of the fluid of the first port (A') toward the third port (C'). This first non-return valve (9) is a non-return valve of the "with spring" type. The second channel (8), for its part, allows free circulation of the fluid between the second port (B') and the fourth port (D').

In the second position (6) the distributor (4) includes two other channels: a third channel (10) which puts the third port (C') directly in communication with the fourth port (D') so that the fluid can circulate freely between these two ports (C' and D'), and a fourth channel (11) allowing one to establish communication between the first port (A') and the third channel (10). This fourth channel (11) includes a second non-return valve (12) which allows only circulation of the fluid of the third channel (10) toward the first port (A'). The second non-return valve (12) is also a non-return valve of the "with spring" type. The second port (B'), for its part, is closed in the second position (6).

Each position (5, 6) is made operational by a control device (13) and is locked in operating position by means of a locking device (14). The control device (13) guides placement of the distributor (4):

in the first position (5) starting from the prevailing pressure at the first connection port (A) or at the first port (A');

in the second position (6) starting from the pressure prevailing at the second connection port (B).

The valve (1) also includes a third non-return valve (15) which is inserted between the second connection port (B) and the second port (B'). This non-return valve (15) allows only circulation of the fluid of the second port (B') toward the second connection port (B). This third non-return valve (15) is also a non-return valve of the "with spring" type.

Functioning of this valve (1) in accordance with the invention will appear clearly in the following description of one example of use with a double-rod (17) jack (16). The first chamber (18) of this jack (16) is connected to the third connection port (C) by a first conduit (19), while the second chamber (20) of the jack (16) is connected to the fourth connection port (D) by a second conduit (21).

In order to lift the mass (22), the pump (23) and the tank (24) of the fluid power source (2) are placed respectively in communication with the first connection port (A) and the second connection port (B) respectively.

If the distributor (4) is in the second position (6) (FIG. 2), the pressure supplied by the pump (23) at the level of the first connection port (A) causes automatic neutralization of the locking device (14), then guidance by the control device (13) of the placement of the distributor (4) in its first position (5). As soon as this first position (5) is reached (FIG. 1), the locking device (14) again automatically locks the distributor (4) in this new position. The fluid delivered by the pump (23) opens the first non-return valve (9), circulates in the first conduit (19) and enters the first chamber (18) of the jack (16). Having done this, this fluid pushes back the rod (17)-piston (25) assembly in the cylinder (26) in order to raise the mass (22). During this displacement the piston (25) expels the fluid contained in the second chamber (20) of the jack (16), and this fluid circulates in the second conduit (21) and the second channel (8), opens the third non-return valve (15), and flows into the tank (24) of the fluid power source (2). One should note that after stopping the fluid power supply, the prevailing pressure in the first chamber (18) of the jack (16) is maintained by the first non-return valve (9). One should also note that in this case the third non-return valve (15) isolates the second chamber (20) of the jack (16) from possible pressure increases that can appear at the second connection port (B).

In order to return to the situation shown on FIG. 2, the pump (23) and the tank (24) of the fluid power source (2) respectively are placed in communication with the second connection port (B) and the first connection port (A) respectively. The pressure supplied by the pump (23) at the level of the second connection port (B) (the third non-return valve (15) prevents circulation of the fluid through the second channel (8)) causes automatic neutralization of the locking device (14), then guidance by the control device (13) of the placement of distributor (4) in its second position (6). As soon as this second position (6) is reached (FIG. 2), the locking device (14) again automatically locks the distributor (4) in this new position. The force created by the mass (22) then causes displacement of the rod (17)-piston (25) assembly in the cylinder (26). The fluid contained in the first chamber (18) is transferred to the second chamber (20) through the first conduit (19), the third channel (10) and the second conduit (21).

In this use the displacement of the rod (17)-piston (25) assembly stops when the spring (27), which is mounted in parallel with the jack (16), supports the mass (22).

One should observe that because of the presence of the second non-return valve (12), which allows one to place the third channel (10) in communication with the tank (24) of the fluid power source (2), the pressure of the fluid contained in the jack (16) is low or even zero. Therefore, at the time of displacement of the mass (22) allowed by the spring (27) between the extreme positions (22' and 22"), which results in displacement of the rod (17)-piston (25) assembly in the cylinder (26), the seals (28, 29, 30) of the jack (16) do not exert any tightening on the rod (17)-piston (25) assembly. The rod (17)-piston (25) assembly can therefore move freely or almost freely in the cylinder (26) of the jack (16).

It is understood that the valve (1) which has just been described can lack the third non-return valve (15) in the case in which, in the first position (5), it is not necessary to isolate the second chamber (20) of the jack (16) from possible pressure increases that can arise at the second connection port (B).

It is also understood that the valve of the invention can be used in other applications than the one that has just been described (hydraulic or pneumatic).

It is also understood that the adjustment value of the non-return valves (9, 12 and 15) will depend on the use of the valve. A large array of valves could thus be created with different adjustment values.

One could even make a valve in which at least one of the non-return valves (9, 12, 15) does not have a spring.

Preferably, however, the second non-return valve (12) will be a non-return valve with a spring.

One could also create valves in which the first connection port (A) and/or the third connection port (C) and/or the fourth connection port (D) will be combined with the first port (A') and/or the third port (C') and/or the fourth port (D') respectively.

The control device (13) could have any configuration whatsoever in which it allows placement of the distributor (4) in its first position (5) and in its second position (6).

The locking device (14) finally could also have any configuration whatsoever in which it allows locking of the distributor (4) in each of its two positions (5 and 6).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters: Patent of the United States is:

1. A valve unit comprising:

a first and a second connection ports which are adapted to be connected directly or indirectly to a fluid power source;

a third and a fourth connection ports which are adapted to be connected directly or indirectly to at least one mechanism to be driven by fluid whose flow is controlled by the valve unit;

a distributor comprising a first, a second, a third and a fourth ports which are connected to said first, second, third and fourth connection ports, respectively, said distributor being adapted to be able to take first or second positions;

a control device which controls said distributor to take said first or second positions;

a locking device which locks said distributor in said first or second positions;

a first valve provided so as to allow flow only from said first port to said third port when said distributor is in said first position;

a second valve provided so as to allow flow only from said third and fourth ports to said first port when said distributor is in said second position; and said second and fourth ports being directly connected and said first and third ports being connected via said first valve when said distributor is in said first position, and said third and fourth ports being directly connected and said third and fourth ports being connected to said first port via said second valve when said distributor is in said second position.

2. A valve unit according to claim 1, further comprising:

a third valve provided between said second port and said second connection port so as to allow flow only from said second port to said second connection port.

3. A valve unit according to claim 2, wherein at least one of said first, second and third valves is a spring valve.

4. A valve unit according to claim 1, wherein at least said second valve is a spring valve.

5. A valve unit according to claim 1, wherein said control device controls said distributor so as to take said first position when a prevailing pressure is supplied at said first connection port and take said second position when the prevailing pressure is supplied at said second connection port.

* * * * *